United States Patent [19]

Boucher, Jr. et al.

[11] Patent Number: 4,789,295

[45] Date of Patent: Dec. 6, 1988

[54] ARTICLE MANIPULATOR FOR ROBOT

[75] Inventors: Raymond J. Boucher, Jr., Raleigh; Jack E. Inscoe, Morrisville, both of N.C.

[73] Assignee: International Business Machines Corp., Armonk, N.Y.

[21] Appl. No.: 909,062

[22] Filed: Sep. 16, 1986

Related U.S. Application Data

[63] Continuation of Ser. No. 705,777, Feb. 26, 1985, abandoned.

[51] Int. Cl.[4] .................................................. B60P 1/02

[52] U.S. Cl. ......................................... 414/497; 294/2; 414/627; 414/661; 414/731; 414/280; 414/607

[58] Field of Search ................................ 294/2, 67.22; 414/627 X

[56] References Cited

U.S. PATENT DOCUMENTS

| | | | |
|---|---|---|---|
| T998,009 | 9/1980 | Bevan | 901/30 X |
| 2,256,453 | 9/1941 | Bomar | 414/661 X |
| 2,388,458 | 11/1945 | Alfonte | 414/417 |
| 2,996,204 | 8/1961 | Jensen | 414/661 |
| 3,039,635 | 6/1962 | Drackett et al. | 414/661 X |
| 3,750,804 | 8/1973 | Lemelson | 414/276 |
| 3,782,565 | 1/1974 | Doran | 414/274 |
| 3,820,667 | 6/1974 | Critchlow | 414/627 |
| 3,850,116 | 11/1974 | Mackes | 414/661 X |
| 4,219,847 | 8/1980 | Pinkney et al. | 901/9 X |
| 4,479,751 | 10/1984 | Wyman et al. | 414/406 |
| 4,492,504 | 1/1985 | Hainsworth | 414/280 X |
| 4,514,616 | 4/1985 | Warner | 901/49 X |
| 4,580,941 | 4/1986 | Inaba et al. | 901/49 X |
| 4,655,674 | 4/1987 | Kohler et al. | 901/49 X |

FOREIGN PATENT DOCUMENTS

| | | | |
|---|---|---|---|
| 113155 | 7/1984 | European Pat. Off. . | |
| 2549898 | 5/1977 | Fed. Rep. of Germany | 901/47 X |
| 1557577 | 12/1979 | United Kingdom . | |

*Primary Examiner*—Robert J. Spar

*Assistant Examiner*—Jennifer L. Doyle

*Attorney, Agent, or Firm*—Joscelyn G. Cockburn

[57] ABSTRACT

An article manipulator for use with an industrial robot includes an upper frame adapted for fastening to the industrial robot and a lower frame coupled to the upper frame. A pair of lifting members operable for lifting an article are connected to the lower frame. At least one vacuum cup is coupled to the frame and is restrained to move in a plane substantially parallel to the lifting members. Sensing mechanisms are provided for sensing the position of an article relative to the manipulator and for generating electrical signals which are utilized by a controller to enable the vacuum cups to grip the article at one side and move the article onto the lifting members. Subsequently, the manipulator transfers the articles to a second position. The manipulator is suited for depalletizing and/or palletizing parallelepiped shape articles.

15 Claims, 6 Drawing Sheets

ARTICLE MANIPULATOR FOR ROBOT

This is a continuation of co-pending application Ser. No. 705,777 filed on Feb. 26, 1985, now abandoned.

BACKGROUND OF THE INVENTION (1) Field of the Invention

The present invention relates to devices for handling articles in general and more particularly to automatic devices for depalletizing/palletizing boxes and manipulating them, for instances, for transferring them from one position to another as on an assembly line.

(2) Prior Art

In order to reduce product cost, improve product quality and increase product throughout, the current trend in industry is to automate the assembly lines that manufacture the product. Automated assembly lines necessitate the use of robotic systems for performing tasks that were formerly done by humans. A fully automated assembly line includes a conveyor system with a plurality of workstations disposed along the conveyor system. The conveyor system transports the components that are used to manufacture the product while the actual fabrication of the product is done at the different workstations.

Each workstation is fitted with a robotic system designated to perform an assigned task. Included in the assigned task is the depalletizing of boxes. Usually, the boxes carry the components that are used in the fabrication of a particular product. Other tasks include opening the boxes, removing the components from the boxes, assembling the component in a finished product, testing the product, packaging the product, and palletizing the product for shipment to the ultimate user.

The typical robotic system includes a robot and an article handling system connected to the robot. The article handling system is usually designed to handle and/or manipulate the article while the robot is the mechanism that move the article handling system and its attached article to a designated point. Article handling systems may be broadly classified into two types, namely: the gripping type and the lifting type.

The gripping type article handling systems invariably include a gripping mechanism that attaches to the top of an article, such as a box, and moves said article from one position and/or place to the next. Such gripping mechanism may include suction cups to which a source of negative pressure is applied to effectuate attachment to the article. Alternately, attachment may occur by magnetic means and/or mechanical means. U.S. Pat. Nos. 4,266,905; 4,299,533; 4,242,025 and 4,392,766 describe gripping mechanisms in which negative pressure is used to effectuate attachment.

On the other hand, the lifting type article handling systems may be considered to be reminiscent of the fork lift devices used in warehouses to move articles. Such devices consist of a pair of spaced forks or lifting elements which are inserted under the bottom side of the article. As a result, the article sits on the forks and is relocated.

Although the above identified article handling systems work well for the intended purpose, they all handle the boxes from either the top side or the bottom side and as such are not suitable for use on the type of automated manufacturing lines wherein the components for manufacturing the product are provided in boxes (such as cartons) having removable covers (shoe box style).

Since the top covers are loose, such cartons cannot be handled and/or depalletized by holding onto the covers.

SUMMARY OF THE INVENTION

It is therefore a general object of the present invention to provide a more efficient article manipulating system than was heretofore possible.

It is another object of the present invention to provide an article manipulating system that handles articles such as boxes from the sides and bottom.

The improved article manipulating system includes a frame, a gripper apparatus, a lifting apparatus, an air/-vacuum supply system and a plurality of sensors adapted to generate electrical signals representative of the relative position between the box to be handled and the manipulating system. The frame includes a top section with an adjustable plate adapted to be mounted to the mounting plate of a robot. A lower section, carrying a pair of spaced forks or load carrying members (lifting apparatus), is adjustably coupled to the upper frame. Preferably, the load carrying members are beveled at the extremities and are hinged at a point between said extremities and the vertical members of said lower section. The gripper apparatus includes a pair of suction cups mounted on the extremity of an air cylinder piston. The air cylinder in turn is mounted on the lower section. Vacuum for operating the suction cups is supplied from a vacuum generator which is also mounted on the lower section of the frame.

In order to depalletize boxes, the robot positions the article manipulating system above the load of boxes. A sensor, mounted on the lower frame section, senses for the presence of a box. Once the box is sensed, the robot transports the article manipulating system from the zone above the box to a zone whereat the extremities of the forks are placed in a plane substantially parallel to the bottom surface of the first layer of boxes on the pallet. A sensor seated on the air cylinder piston rod senses for the presence of a box in the horizontal plane. On sensing a box, an electrical signal is generated and is used to activate the vacuum/air supply. As a result, the piston and attachment are extended beyond the extremity of the forks. The vacuum cups on the piston rod grip the box at its side pulling it onto the forks. The box is then transferred to its predetermined location on a conveyor belt.

The foregoing features and other advantages of this invention will be more fully described in the accompanying drawings.

Figure 1:
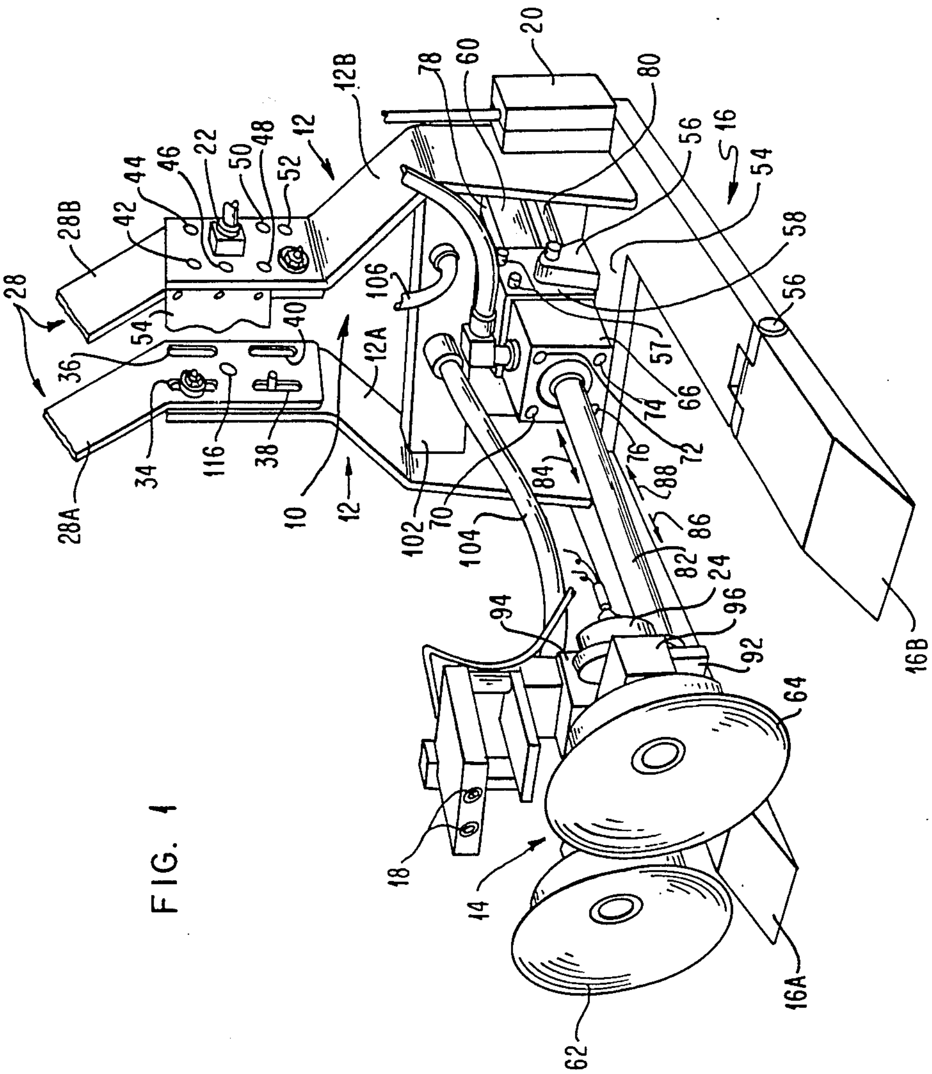
FIG. 1 represents a pictorial view of the article manipulator according to the teachings of the present invention.

The article handling apparatus 10 includes a frame assembly (12A, 12B, 28A and 28B), a gripper mechanism 14, a lifting device 16, a set of sensors (18, 20 and 22) for sensing the position of the article manipulator relative to an article and a second set of sensors (24 and 26, FIG. 2) for sensing when an article is securely held by the article manipulator. In operation, a general purpose robot (to be described hereinafter) positions the lifting member 16 relative to the bottom surface of a box to be transported. The gripper mechanism 14 is extended beyond the extremity of the lifting device to grip the box and pull the box onto the lifting device (FIG. 3). With the box being secured on the lifting members by the gripper mechanism, the box is then moved from the pallet (not shown) to the conveyor line (not shown). The box as it progresses down the line will be accessed by a robot to remove parts and fabricate a product. The product is then loaded into the box and the box is palletized for shipping to respective customers.

Figure 2:
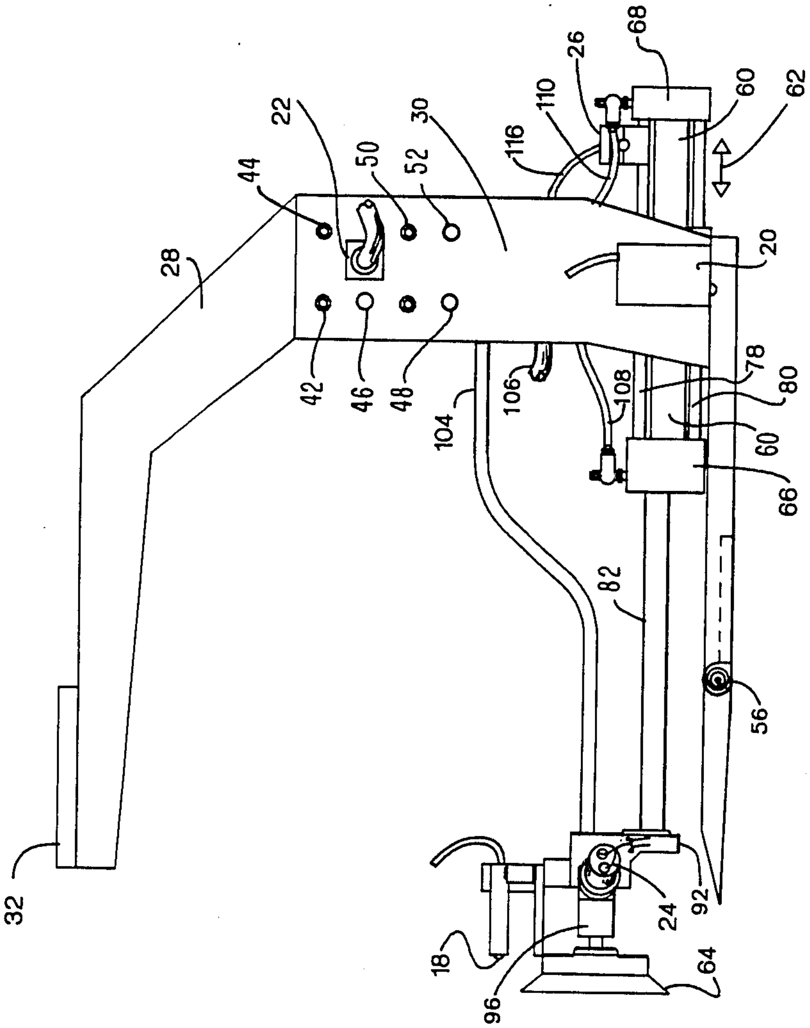
FIG. 2 shows a side elevational view of the subject article manipulator with the picker mechanism extended.
Figure 3:
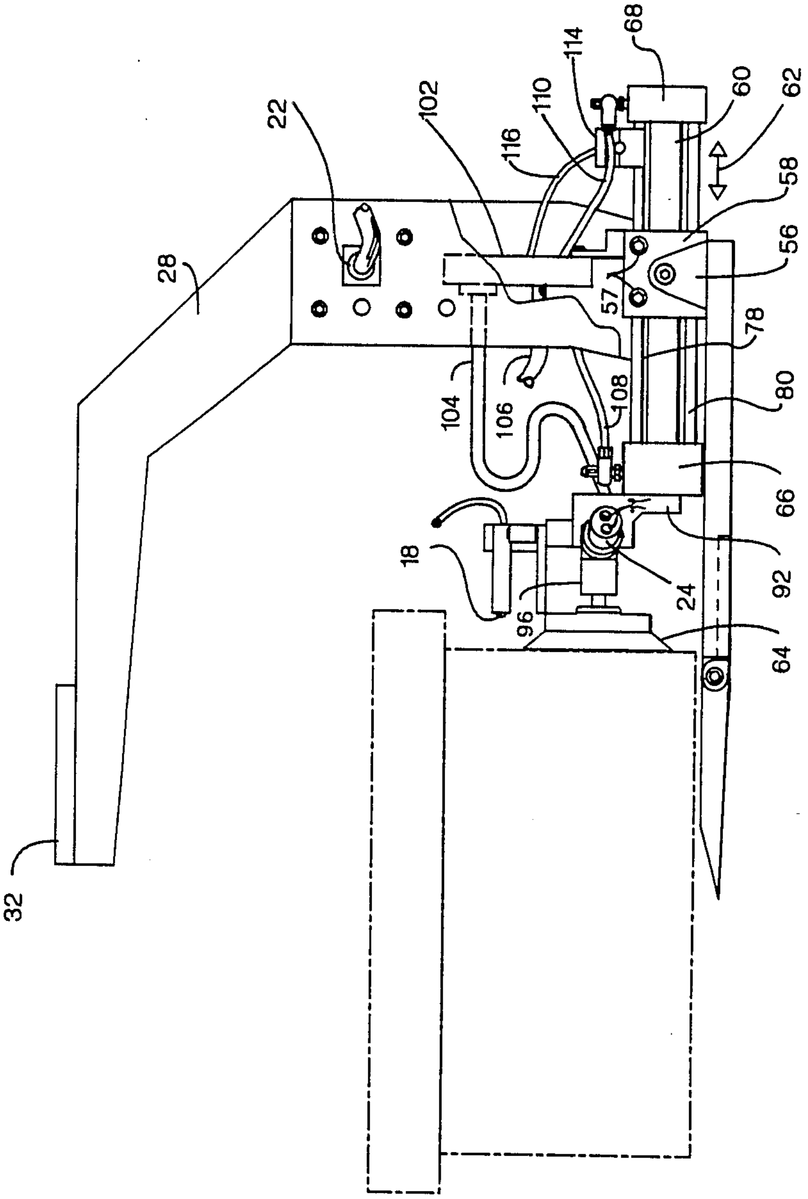
FIG. 3 shows a side view of the subject article manipulator with the picker mechanism retracted. The figure also shows how an article is handled from the sides and bottom.
Figure 4:
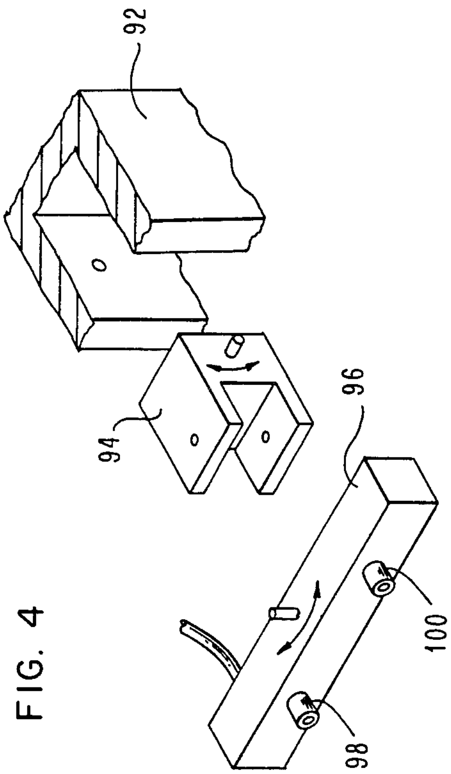
FIG. 4 shows a universal joint for mounting the picker mechanism.

Referring now to FIGS. 1 and 2, common elements will be identified by the same numeral. The frame assembly includes a top section 28 and lower section 12. The top section 28 includes a pair of arcuate members 28A and 28B that are fastened in spaced relationship to a mounting plate 32. The mounting plate in turn is adjustably mounted to the wrist of the robot tool mounting plate (not shown). Although the article manipulator of the present invention can be used with any general purpose industrial robot in the preferred embodiment of this invention the article manipulator was attached to the tool mounting plate of a the Cincinnati Milacron T3-776 Robot.

A plurality of slots identified by numerals 34, 36, 38 and 40 are fabricated on the lower extremity of the member 28A. A similar set of slots (not shown) are fabricated on member 28B. As will be explained subsequently, these slots serve a dual purpose. The slots are used to fasten the top section of the frame to the lower section (to be described hereinafter) and provide an adjustment mechanism so that the lower section of the frame can be adjusted relative to the upper section.

The lower section 12 comprises of irregularly shaped members 12A and 12B. Each of the members is fabricated from flat light-weight metal such as aluminum. Member 12B is fabricated with a plurality of circular holes some of which are identified by numerals 42, 44, 46, 48, 50 and 52. A similar set of holes (not shown) is fabricated on the upper extremity of member 12A. The holes on members 12A and 12B are used for fastening the lower section of frame 12 to the upper section 28. To this end, a plurality of screws, some of which are shown in FIG. 1, are inserted into the holes located on the respective members of the frame. By tightening respective nuts on the respective screws, the lower section of the frame is connected firmly to the upper section. A bracket member identified by numeral 54 is traversely fastened to the upper members at the point whereat the lower frame joins the upper frame. The function of the traverse strap 54 is to provide structural strength to the frame assembly.

Still referring to FIGS. 1 and 2, the lifting device 16 is substantially U-shaped with a pair of spaced lifting forks or members 16A and 16B, respectively. A traverse member 54 interconnects the lifting fork at its rearward extremity. The lifting device 16 is connected to the lower frame section 12. A hinged means 56 is fabricated in each of the lifting members 16A and 16B, respectively. In the figure, only one of the hinges is shown, it being understood that a similar hinge is provided in lifting member 16A. The front extremities of the lifting members are beveled. As a result of the beveling and hinges associated with each lifting member, the lifting device 16 can get relatively close to a pallet, (not shown) carrying carton boxes of parts, and approach the carton at an angle without causing the main body of the bottom section of the article handling mechanism to hit the pallet.

Referring to FIGS. 1, 2 and 3, the gripper mechanism 14 is mounted by a pair of mounting brackets, only one of which is shown and is identified by numeral 56 to member 54. The function of the gripper mechanism 14 is to grip a box from the side (FIG. 3), separate said box from a pallet load of boxes (not shown), and place the box on lifting devices 16A and 16B, respectively. The mounting brackets are pivotally coupled to slide mount means 58. The slide mount means 58 is slidably coupled to air cylinder 60. By slidably coupling the air cylinder 60 to slide mount means 58 the air cylinder 60 (to be described subsequently) can be adjusted in the direction shown by arrow 62. As a result of this adjustment feature, the gripper mechanism 14 can be made to handle variable size boxes.

With reference to FIGS. 2 and 3 for the moment, the air cylinder 60 is adjusted so that the slide mount means 58 is positioned at a point on the air cylinder that enables the gripper mechanism 14 to extend vacuum cups 62 and 64, respectively, beyond the tips of lifting members 16A and 16B, respectively. Likewise, in FIG. 1, the air cylinder 60 is adjusted so that the slide mount means 58 is at the extreme front end of the air cylinder 60. With this adjustment the reach of vacuum cups 62 and 64 is less than that of FIGS. 2 and 3. The adjustment is effectuated by loosening a plurality of screws, two of which are identified by numeral 57, and sliding a plurality of mounting rods, two of which are identified by numerals 78 and 80, relative to the slide mount means. As will be explained subsequently, the mounting rods are part of the cylinder.

Still referring to FIGS. 1, 2 and 3, air cylinder 60 is a conventional off-the-shelf item. It is used to position vacuum cups 62 and 64 relative to a box. The use of such air cylinders as a positioning device is well known in the prior art. Therefore, the details of the air cylinder will not be given. Suffice it to say that the air cylinder includes a cylinder portion with a front block 66 and a rear block 68. Both the front and the rear blocks are fabricated with four openings identified in block 66 with numerals 70-76 (FIG. 1). A similar set of holes is also provided in block 68. Four rods, two of which are shown in FIG. 3 and are identified by numerals 78 and 80, are mounted in the respective openings. A piston rod identified by numeral 82 is constrained to move within the cylinder in the direction shown by arrow 84. One end of the piston rod (not shown) is trapped inside the cylinder and is fitted with a piston (not shown). By forcing air on the appropriate side of the piston, it is made to extend in the direction shown by arrow 86 or it can be retracted in the direction shown by arrow 88. Although any off-the-shelf conventional air cylinder can be used to perform the recited function in the preferred embodiment of this invention, a PHD 10-inch non-rotating cylinder was used.

Figure 5:
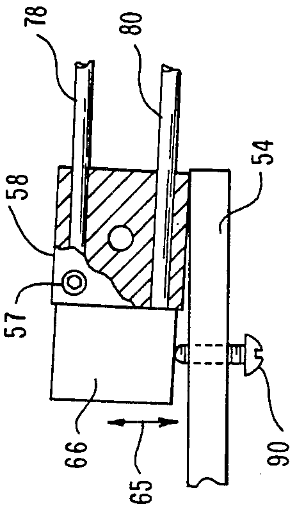
FIG. 5 shows a device for adjusting the picker mechanism.

As was stated previously, the air cylinder 60 is adjusted relative to slide mount means 58. To this end a relatively large opening having a size that will accept the width of the air cylinder 60 is fabricated in the center of the slide mount means. Four small holes similar to those fabricated in front block 66 and rear block 68 are fabricated in slide mount means 58. The front block 66 is removed from the air cylinder and the respective rods are passed through the respective holes in slide mount means 58. The front block 66 is then refitted. Referring to FIG. 5 for the moment, there is shown an adjustment feature which enables the gripper mechanism to be adjusted in the vertical plane. An adjustment means, preferably a screw identified by numeral 90, is threaded through cross member 54. The leading end of the screw is in contact with front block 66. By turning the screw the front block and attached mechanism are made to be adjusted upward or downward in a vertical plane identified by numeral 65.

Referring now to FIGS. 1, 2, 3 and 4, a mounting bracket identified by numeral 92 is connected to piston rod 82. A swivel block 94 (FIGS. 1 and 4) is pivotally mounted to mounting block 92. A manifold 96 is pivotally mounted to swivel block 94. As will be explained subsequently, the swivel block and pivotally coupled manifold operate as a universal joint to enable vacuum cups 62 and 64 to adjust relative to the shape or position of a box to be picked. Two vacuum cups 62 and 64 are mounted via mounting posts 98 and 100 to the manifold. Although two vacuum cups are shown and described herein, this should not be construed as a limitation on the scope of the present invention since it is within the skill of one skilled in the art to utilize a different number of vacuum cups to provide the means for picking a box.

The invention further includes a air/vacuum system which provides vacuum and air for proper operation of the picker mechanism. With reference to FIGS. 1 and 3, the air/vacuum system includes a vacuum generator identified by numeral 102. The vacuum generator 102 is a conventional device that generates a vacuum when air is allowed to enter into the device. Since this is a well-known conventional device, details of its operation and construction will not be given. Suffice it to say that in the preferred embodiment of this invention a PIAB vacuum generator was used.

An interconnecting hose identified by numeral 104 interconnects the side of the generator which provides negative pressure to manifold 96. Similarly, air from an air generating source (not shown) is conveyed through tube 106 to the positive pressure side of the generator. The vacuum generator provides vacuum (negative pressure) for suction cups 62 and 64, respectively.

As will be explained subsequently, by activating solenoid valve (not shown) with signals from the robot's, controller air is admitted into the vacuum generator 102 and as a result a vacuum is created in the manifold 96 and ultimately to suction cups 62 and 64, respectively.

As stated previously, the air cylinder 60 requires air for proper operation. To this end, two fluid conduction means identified by numerals 108 and 110 (FIGS. 2 and 3) interconnect the air cylinder 60 to a suitable air supply (not shown). When the air in conducting means 110 is activated, the piston is forced to be extended and moves in the direction shown by arrow 86, FIG. 1. Similarly, when the air in conducting means 108 is activated, the piston is retracted in the direction shown by arrow 88.

Figure 6:
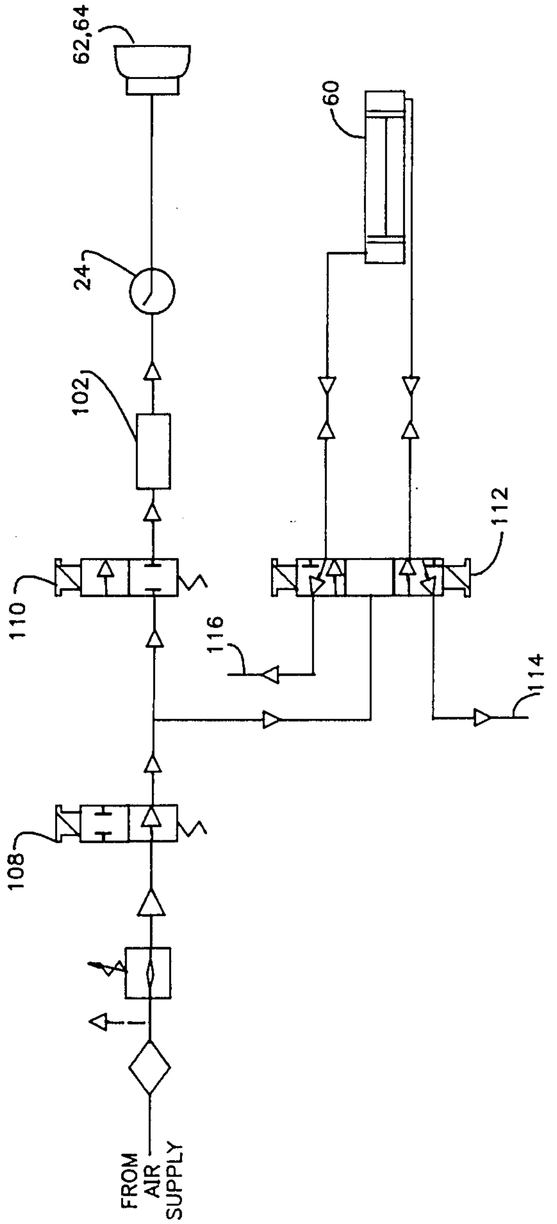
FIG. 6 shows an air logic schematic for controlling the article manipulator.

FIG. 6 shows an air logic schematic for the air/vacuum system. The air logic schematic provides vacuum/air supply to vacuum cups 62 and 64 and air cylinder 60, respectively. Air is supplied with a pressure of approximately 80–90 psi. The output line from the air supply is coupled through a solenoid 108. The solenoid is an off-the-shelf air solenoid which functions as a on-off switch and is activated by a signal outputted from the robot's control. In the preferred embodiment of this invention, the solenoid was fabricated by Schrader, Inc. The output from the on-off solenoid switch 108 is fed into a vacuum off-on solenoid switch 110 and a double-throw solenoid 112. The double-throw solenoid 112 controls the air cylinder 60. The double-throw solenoid is provided with exhaust valve 114 and 116, respectively. Each exhaust valve provides a means for bleeding air from the piston when it is about to move in the opposite direction. Likewise, solenoid 110 provides the on-off air to vacuum generator 102. The output from vacuum generator 102 is coupled through vacuum switch 114 to the vacuum cups 62 and 64. As will be explained subsequently, whenever vacuum is applied to the cups, the switch will output a signal when vacuum is made between the cup and a box. The output from the vacuum switch is utilized by the robot controller to move the box.

As was stated previously, several sets of sensors are provided to sense the position of the lifting mechanism relative to the box. Two proximity sensors identified by numerals 18 and 20 (FIGS. 1 and 2) are located on top of the vacuum manifold 96 and on the side of lower frame 12. Sensor 18 is used to determine whether there is a carton box in the path of the gripper in the horizontal plane when the gripper is searching for a carton and it is simultaneously used to signal the robot's controller to turn on the vacuum generator in the event the carton is found. This is done by the robot controller generating a signal to solenoid 110, FIG. 6.

Likewise, sensor 20 (on the side of the lower frame) is mounted in the vertical plane and is used to determine (in a search procedure to be described hereinafter) if the carton is where it should be (that is, enough boxes in the stack). That initial point is used as a reference point for the robot's controller to determine where the bottom of each carton in the stack should be, thus allowing the arms of the lower frame to be located at the level of the bottom of the carton. Reed switch 114 (FIG. 3) senses when a carton is fully seated on the lifting legs and outputs a signal on conductor 116. To this end, a magnetic ring (not shown) is fitted on the piston (not shown) which is attached to the extreme end of piston 82 and lies within air cylinder 60. Because the reed switch is situated at the extreme back of the cylinder, whenever the magnetic ring passes the reed switch a signal is generated and outputted on conductor 116. The signal indicates that the picking mechanism is fully retracted and the carton is properly seated on the lifting mechanism (that is lifting members 16A and 16B). At this point the robot controller generates a signal which moves the article handling mechanism and the attached box, FIG. 3, to a predetermined point, usually to a conveyor belt (not shown).

Another set of sensors to be described shortly is mounted at the junction where lower frame 12 joins upper frame 28 (FIG. 1). The function of the sensors is to detect abnormal motion in the gripper which would result from striking an object in a way that would damage the gripper. To this end a light emitting device 22 is mounted on one section of the lower frame, say side 12B, and a light receiving device (not shown) is mounted on the opposite frame 12A in the hole identified by numeral 116. Since the light generating device 22 and the light receiving device (not shown) are mounted diametrically any motion in the lower frame, be it upward or arcuate, breaks the beam between the light receiving device and the light emitting device resulting in a signal which is generated and fed to the robot controller. As a result of this signal, the article handling mechanism is shut down. In the preferred embodiment of this invention the frames are designed with slots that allow approximately 800-inch of upward travel by the lower frame 12 and/or a 15° upward tilt of the lower frame. The sensor's light beam will be broken by the passing of the lower frame over the mounting holes of the sensors. The breaking of the beam signals the robot controller to stop all program activity and therefore all motion. This prevents unnecessary damage to the gripper by cartons, etc. which are encountered out of place by the gripper. Although specific measurements are given, this should not be construed as a limitation on the scope of the invention since it is within the skill of the art to design other tolerances without departing from the scope of the present invention.

Figure 7:
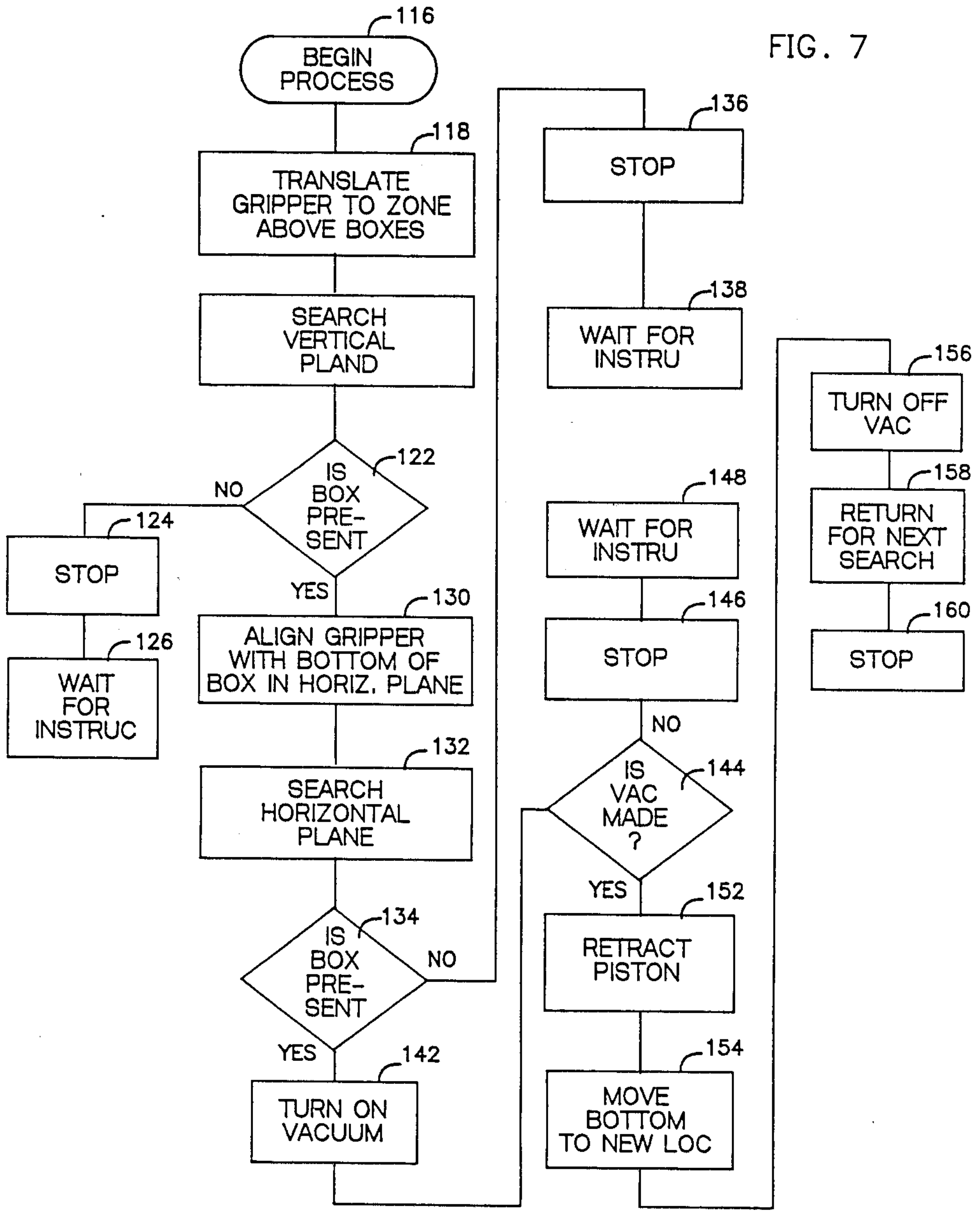
FIG. 7 is a flow chart showing the overall operation of the system.

FIG. 7 shows a flow chart of the process steps which must be performed in order for a box to be depalletized and placed on a conveyor (not shown). The flow chart includes the functions which the robot controller (not shown) must perform in order to provide the motion control necessary for positioning the box. The robot controller utilizes the signals which are generated from the above described sensors to position the article handling mechanism. The programming of such controllers is well known; therefore, the detailed code which is written in the controller in order to perform the process steps outlined in the flow chart is not given, it being understood that it is well within the skill of one skilled in the art of programming to utilize the information set forth in the flow chart to provide the necessary code for controlling the robot. The first step in the process is identified in block 116. The block signifies the beginning of the process. The program then descends into block 118 where the gripper mechanism is transferred to a zone above the pallet carrying the boxes. The program utilizes the vertical sensor (previously described) to search the vertical plane to make sure there is a box. If no box is discovered (block 122), the program then enters block 124 where it is stopped and then into block 126 where it waits for another instruction.

If a box is sensed in the vertical plane (block 122), the program then descends into block 130 where the robot moves the gripper mechanism and aligns the lifting members with the bottom surface of the first row of boxes on the pallet. The program then descends into block 132 where it searches the horizontal plane for the presence of a box via the horizontal sensor (previously described above). If no box is sensed in the horizontal plane (block 134), the program then enters block 136 where it stops and then to block 138 where it waits for an instruction.

If a box is sensed in the horizontal plane, the program then enters block 142 where it extends the piston and turns the vacuum. The program then enters block 144 where it checks to make sure the vacuum is made between the vacuum cups and the box to be picked. This checking is done by vacuum switch 24 (FIG. 1). If there is no vacuum, the program enters block 146 where it stops and then block 148 where it waits for an instruction.

If vacuum is made (block 144), the program then enters block 152 where the piston is retracted and then to block 154 where the box is moved from the pallet to a new location. The program then turns the vacuum off block 156 and then returns for a next search, that is, to remove another box (block 158). The process continues until all boxes are removed from the particular pallet and the program stops the device (block 160).

OPERATION

In operation, the program controlled robot utilizes signals outputted from the above described sensors to orientate the gripper mechanism so that the forks or lifting members are oriented in a plane parallel to the boxes bottom side. The piston of the air cylinder with its attached vacuum cups are extended beyond the forks. At a specified distance from the boxes vacuum is applied to the suction cups. When the vacuum is made between the suction cup and the box, a signal is outputted from the vacuum switch 24. The robot controller then activates the air supply which causes the piston to be retracted to pull the carton box onto the forks. The carton is then lifted free of the stack on the pallet.

The ends of the forks are hinged to allow the gripper to operate on the surface of the pallet or slip-sheet. By hinging the lifting members, the gripper can be tilted to allow only the hinged portion of the lifting members to contact and to follow the surface of the pallet or slip-sheet while approaching the bottom cartons of a load. The gripper can be adjusted forward and backwards relative to its mounting plate and can be open or closed in height to allow for larger or smaller boxes.

Having described our invention, what we claim and desire to secure as Letters Patent is as follows:

1. A pneumatic article manipulating device for use with a robot to unload single boxes from a stack of boxes comprising:

a frame operable for coupling said device to the robot;

a lifting means fixedly connected to said frame and operable for supporting an article thereon;

a linear actuator fixedly mounted on the lifting means, said linear actuator including an air cylinder means driving an elongated piston constrained to move in a linear path;

a vacuum gripping means fixedly coupled to said piston; said gripping means moving in a linear path substantially parallel to the lifting means to grip the article on one of its sides and placing said article on the lifting means and to maintain the stability of the article as it is transported by the manipulating device.

2. The article manipulating device of claim 1 further including control means coupled to the frame and operable for sensing the position of the device relative to the article and for providing electrical signals for enabling operation of said device.

3. The article manipulating device of claim 1 wherein the frame includes a top section, an adjustable mounting plate being coupled to the top section; a lower section and adjustable means for mounting the lower section to the top section.

4. The article manipulating device of claim 3 further including optical sensor means operable for sensing relative motion between the frame sections and to output an electrical signal representative of said motion.

5. The article manipulating device of claim 1 wherein the lifting means includes a pair of spaced elongated flat members and a flat cross member interconnecting the extremities of the elongated flat members thereby forming a unified structure.

6. The article manipulating device of claim 5 wherein the non-interconnecting extremities of the flat elongated members are being beveled.

7. The article manipulating device of claim 6 further including hinged means, one of each being fabricated in one of the spaced elongated flat members.

8. The article manipulating device of claim 1 wherein the gripping means includes;

a vacuum gripping mechanism mounted on one extremity of said piston;

a vacuum/air supply means operable for providing negative pressure to the gripping mechanism and for providing appropriate air flow to the air cylinder means; and means for coupling said vacuum/air supply means to the lifting means.

9. The article manipulating device of claim 8 wherein the gripping mechanism includes a vacuum manifold; a conveying means for supplying negative pressure to the manifold; and at least one suction cup coupled to said manifold.

10. The article manipulating device of claim 8 wherein the vacuum/air supply means includes a vacuum generator; an air supply means and control means operable for controlling air flow from the air supply into the vacuum generator.

11. The article manipulating device of claim 2 wherein the control means includes a first sensing device adapted for sensing the presence of articles along a horizontal plane and a second sensing device adapted for sensing the presence of an article along a vertical plane.

12. A pneumatic article handling apparatus for use with a robot comprising:

a mounting plate for coupling the handling apparatus to the robot;

a frame having spaced members connected to said plate;

a lifting mechanism fixedly connected to the frame; and means for separating an article from a stack fixedly mounted on the lifting mechanism; said means including an air cylinder positioning an elongated piston and a vacuum picking device fixedly connected to the piston and being constrained to move in a linear path substantially parallel to the lifting mechanism to pick and place the article on said lifting mechanism and to maintain the stability of said article as it is transported from one place to another.

13. The article handling apparatus of claim 12 further including a first sensing means mounted on the frame and operable for sensing the article in a vertical plane; and a second sensing means mounted on the frame and operable for sensing the article in a horizontal plane.

14. A manipulating device for use with a robot for unloading single parallelepiped articles from pallets carrying a stack of said articles onto a conveyor system of an automated manufacturing assembly line and to remove said articles from the assembly line onto pallets comprising:

a frame for connecting the device to the robot;

a lifting means fixedly connected to the frame, said lifting means being operable for contacting and supporting the article on one of its sides;

a linear actuator fixedly mounted on the lifting means and including an air cylinder means for positioning an elongated piston constrained to reciprocate along a linear path;

a vacuum gripping means fixedly coupled to one end of the piston said vacuum gripping means being mounted and constrained to reciprocate in spaced and parallel relationship to the lifting means to grip the article on another side and to maintain the stability as it is transported by the manipulating device.

15. An article manipulating device for use with a robot comprising:

a frame operable for coupling said device to the robot;

a lifting means fixedly connected to the frame and operable for supporting an article thereon;

a linear positioning means including an air cylinder and an elongated member fixedly mounted on the frame with the air cylinder operable for reciprocating said elongated member in a linear trajectory substantially parallel to the lifting means; and a vacuum gripping means fixedly coupled to said, elongated member and in spaced relationship to the lifting means, said gripping means being operable to contact the article on one side and placing said article on the lifting means and to maintain the stability of the article as it is transported by the manipulating device.

* * * * *